US011073751B2

(12) United States Patent
Guo et al.

(10) Patent No.: US 11,073,751 B2
(45) Date of Patent: Jul. 27, 2021

(54) WAVELENGTH CONVERSION APPARATUS, LIGHT SOURCE SYSTEM AND PROJECTION DEVICE

(71) Applicant: Appotronics Corporation Limited, Shenzhen (CN)

(72) Inventors: Zuqiang Guo, Shenzhen (CN); Peng Du, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 0 days.

(21) Appl. No.: 16/646,404

(22) PCT Filed: Dec. 6, 2017

(86) PCT No.: PCT/CN2017/114742
§ 371 (c)(1),
(2) Date: Mar. 11, 2020

(87) PCT Pub. No.: WO2019/052026
PCT Pub. Date: Mar. 21, 2019

(65) Prior Publication Data
US 2020/0272039 A1 Aug. 27, 2020

(30) Foreign Application Priority Data
Sep. 13, 2017 (CN) .......................... 201710823494.7

(51) Int. Cl.
*G03B 21/20* (2006.01)
*H04N 9/31* (2006.01)
(Continued)

(52) U.S. Cl.
CPC ....... *G03B 21/204* (2013.01); *G02B 27/0961* (2013.01); *G02B 27/106* (2013.01);
(Continued)

(58) Field of Classification Search
CPC .............. G03B 21/204; G03B 21/2033; G03B 21/2066; G03B 21/208; H04N 9/3152; H04N 9/3158; H04N 9/3161
See application file for complete search history.

(56) References Cited

U.S. PATENT DOCUMENTS

| 2012/0081674 A1 | 4/2012 | Okuda |
| 2012/0327376 A1 | 12/2012 | Mehrl |
| 2013/0021582 A1* | 1/2013 | Fujita ................... G03B 21/204 353/31 |

FOREIGN PATENT DOCUMENTS

| CN | 1954257 A | 4/2007 |
| CN | 102193301 A | 9/2011 |

(Continued)

OTHER PUBLICATIONS

International Search Report dated Jun. 5, 2018, Application No. PCT/CN2017/114742.

(Continued)

*Primary Examiner* — Ryan D Howard
(74) *Attorney, Agent, or Firm* — The Dobrusin Law Firm, PC (57) ABSTRACT

The present disclosure relates to a wavelength conversion device, a light source and a projection device. A light conversion region and a light path conversion region are provided on one surface of the wavelength conversion device. The light path conversion region includes a first segment and a second segment. The first segment and the second segment are configured to alternately receive excitation light and respectively guide the excitation light to different preset light paths. The light conversion region is provided with a wavelength conversion material for receiving excitation light emitted from one of the segments, converting the received excitation light into excited light that has at least one wavelength range different from a wavelength of the excitation light, and emitting the excited light.

20 Claims, 7 Drawing Sheets

(51) Int. Cl.
    *G02B 27/09*          (2006.01)
    *G02B 27/10*          (2006.01)
    *G02B 27/14*          (2006.01)

(52) U.S. Cl.
    CPC ......... *G02B 27/144* (2013.01); *G03B 21/208* (2013.01); *G03B 21/2066* (2013.01)

(56) References Cited

FOREIGN PATENT DOCUMENTS

| | | |
|---|---|---|
| CN | 104808273 A | 7/2015 |
| CN | 105204279 A | 12/2015 |
| CN | 105549312 A | 5/2016 |
| CN | 105980926 A | 9/2016 |
| CN | 106154717 A | 11/2016 |
| CN | 106154718 A | 11/2016 |
| CN | 106444240 A | 2/2017 |
| CN | 106886124 A | 6/2017 |
| JP | 2002139792 A | 5/2002 |

OTHER PUBLICATIONS

PCT/CN2017/114742.
Chinese First Office Action dated Mar. 31, 2020, Application No. CN201710823494.7.
Chinese Second Office Action dated Sep. 30, 2020, Application No. 201710823494.7.

* cited by examiner

WAVELENGTH CONVERSION APPARATUS, LIGHT SOURCE SYSTEM AND PROJECTION DEVICE

TECHNICAL FIELD

The present disclosure relates to the field of projection technology, and in particular, to a wavelength conversion device, a light source system and a projection device.

BACKGROUND

This section is intended to provide a background or context to the specific embodiments of the present disclosure depicted in the claims. Although included in this section, the description here is not admitted to be the prior art.

In the field of projection technology, laser light is typically used to excite phosphors so as to generate excited light. A light source is employed to generate excitation light. Scattering powder is used to scatter the excitation light on a wavelength conversion device to convert the excitation light into Lambertian light. The scattered excitation light and the incident excitation light are split by using their different etendue. The realization of light splitting requires area coating, but area coating will cause loss of the excitation light and affect the uniformity of the excitation light.

However, in the case where no area coating is used, it is necessary to separate light paths of the excited light and the excitation light emitted from the wavelength conversion device.

SUMMARY

In view of the above, the present disclosure provides a wavelength conversion device which can effectively separate light paths of excitation light and excited light, and the present disclosure further provides a light source system and a projection device.

A wavelength conversion device is provided. A light conversion region and a light path conversion region are provided on one surface of the wavelength conversion device. The light path conversion region includes a first segment and a second segment. The first segment and the second segment are configured to alternately receive excitation light and respectively guide the excitation light to different preset light paths. The light conversion region is provided with a wavelength conversion material for receiving excitation light emitted from one of the segments, converting the received excitation light into excited light that has at least one wavelength range different from a wavelength of the excitation light, and emitting the excited light.

A light source system is provided. The light source system includes an excitation light source, a first light guiding device, a second light guiding device, a first light splitting-combining element, and the above wavelength conversion device.

The excitation light source is configured to generate the excitation light, and the excitation light is incident to the light path conversion region of the wavelength conversion device.

The light path conversion region is configured to receive the excitation light and alternately emit excitation light propagated along a first preset light path or a second preset light path, where the first preset light path and the second preset light path are separated from each other.

The first light guiding device is configured to guide the excitation light emitted along the first preset light path to the light conversion region of the wavelength conversion device, and to direct the excited light generated by the light conversion region to the first light splitting-combining element.

The second light guiding device is configured to guide the excitation light emitted along the second preset light path to be incident to the first light splitting-combining element.

The first light splitting-combining, element is configured to guide a light beam emitted by the first light guiding device and a light beam emitted by the second light guiding device to exit along a same light path.

A projection device adopting the above light source system is provided.

The wavelength conversion device, the light source and the projection device provided by the present disclosure avoid utilizing area coating to combine the excited light and the excitation light that are emitted from the wavelength conversion device, which reduces the loss of the excitation light and improves the uniformity of emitted light. In addition, the light source system provided by the present disclosure has a compact structure, which reduces the volume of space occupied by the light source system and is beneficial to the miniaturization design of the projection device adopting the light source system.

BRIEF DESCRIPTION OF DORIGINALINGS

DESCRIPTION OF SYMBOLS OF MAIN COMPONENTS

| | |
|---|---|
| Light source system | 100, 200, 300 |
| Excitation light source | 110, 210 |
| Convergent lens | 212, 232 |
| Supplemental light source | 320 |
| First light guiding device | 130, 230 |
| First reflective element | 131, 231 |
| Second light splitting-combining element | 133, 233, 333 |
| Collection lens group | 135, 335 |
| Second light guiding device | 150 |
| Second reflective element | 151 |
| Homogenizing element | 153 |
| Wavelength conversion device | 170, 270, 370 |

-continued

| Substrate | 171 |
| --- | --- |
| Light path conversion region | 172 |
| First segment | 172a |
| Second segment | 172b, 372b |
| Light conversion region | 173, 373 |
| Red light segment | 173a |
| Green light segment | 173b |
| Transmission region | 374 |
| Driving unit | 176 |
| First light splitting-combining element | 180, 380 |
| First preset light path | L1, M1, N1 |
| Second preset light path | L2, M2, N2 |
| Axis | h, h' |

The following specific embodiments will further describe the present disclosure in conjunction with the above accompanying drawings.

DESCRIPTION OF EMBODIMENTS

Figure 1:
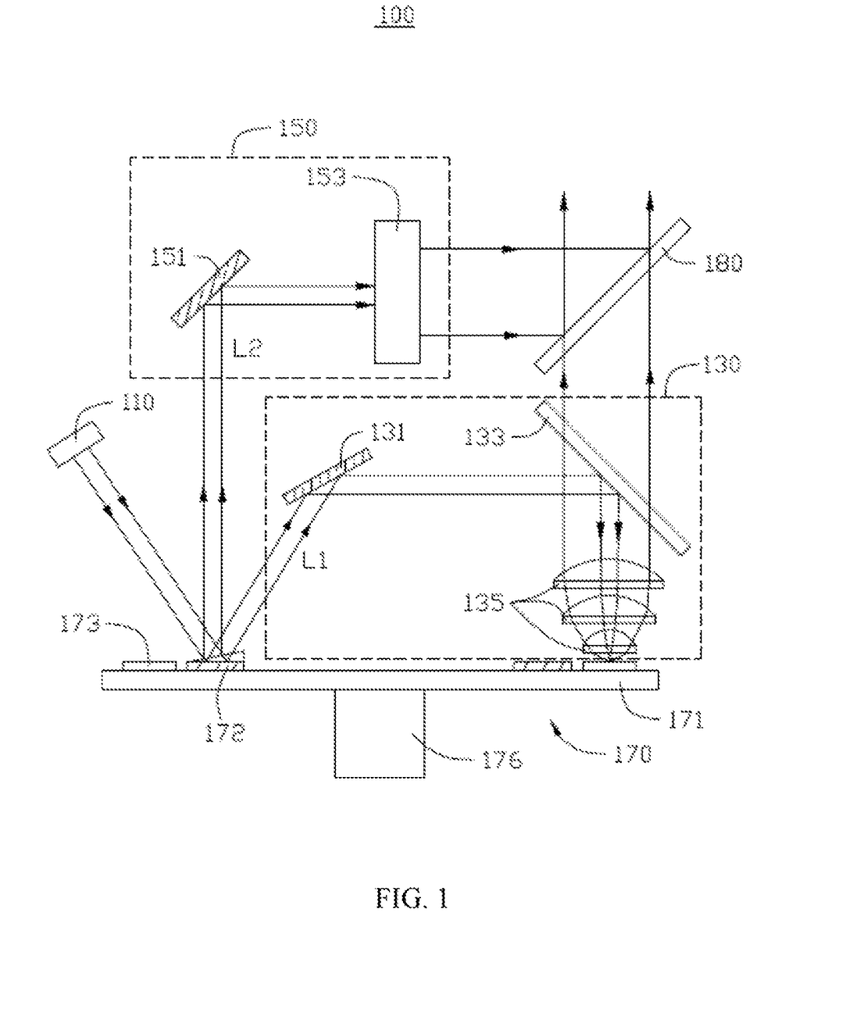
FIG. 1 is a structural schematic diagram of a light source system according to a first embodiment of the present disclosure.
Figure 2:
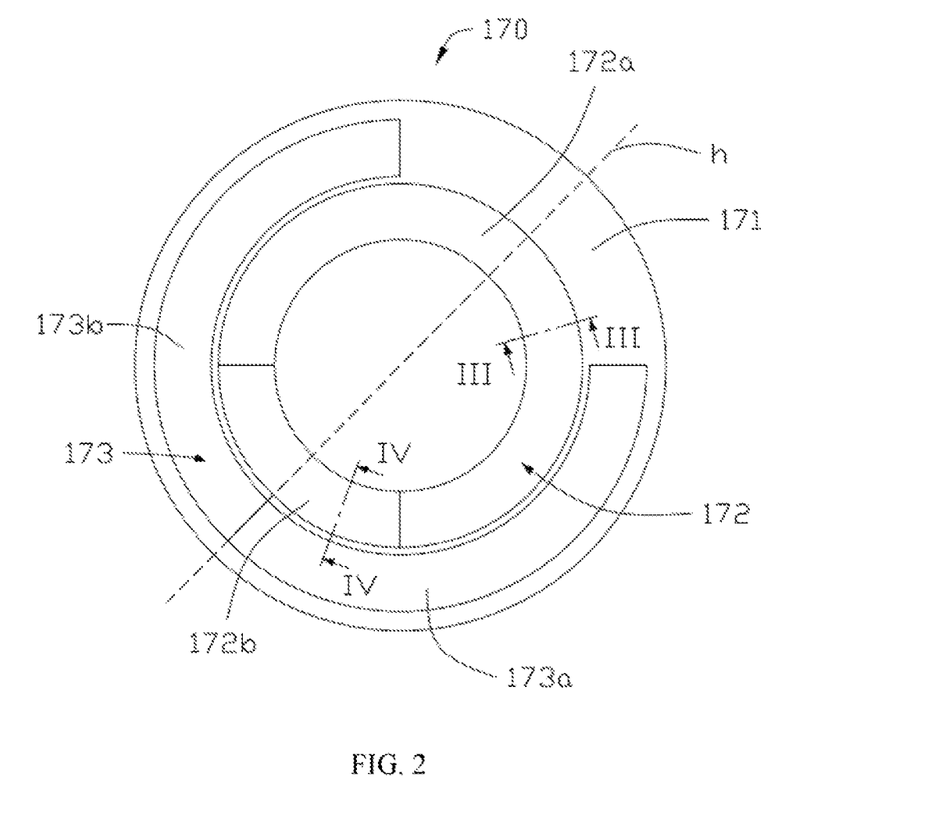
FIG. 2 is a top view of a wavelength conversion device shown in FIG. 1.

Please refer to FIG. 1 and FIG. 2. FIG. 1 is a structural schematic diagram of a light source system 100 according to a first embodiment of the present disclosure. FIG. 2 is a top view of a wavelength conversion device 170 shown in FIG. 1. The light source system 100, applied in a projection device, includes an excitation light source 110, a first light guiding device 130, a second light guiding device 150, the wavelength conversion device 170, and a first light splitting-combining element 180. The excitation light source 110 is configured to generate excitation light, and the excitation light is incident to the wavelength conversion device 170. The wavelength conversion device 170 rotates in a high speed and alternately emits excitation light propagated along a first preset light path L1 or a second preset light pad) L2, where the first preset light path L1 and the second preset light path L2 are separated from each other. The first light guiding device 130 is configured to guide the excitation light emitted along the first preset light path L1 to a light conversion region 173 of the wavelength conversion device 170, and to direct excited light generated by the light conversion region 173 to the first light splitting-combining element 180. The second light guiding device 150 is configured to guide the excitation light emitted along the second preset light path L2 to be incident to the first light splitting-combining element 180. The first light splitting-combining element 180 is configured to guide a light beam emitted by the first light guiding device 130 and a light beam emitted by the second light guiding device 150 to exit along a same light path.

Specifically, the excitation light source 110 can be a blue light source and emit blue excitation light. It can be understood that the excitation light source 110 is not limited to the blue light source, and the excitation light source 110 can also be a ultraviolet light source, a red light source, a green light source, or the like. The excitation light source 110 includes a light emitting member for generating the excitation light. In the present embodiment, the light emitting member is a blue laser configured to emit a blue laser which serves as the excitation light. It can be understood that the excitation light source 110 can include one, two or more blue lasers, and the specific number of the blue lasers can be selected according to actual needs.

The wavelength conversion device 170 includes a substrate 171 and a driving unit 176 located at a bottom of the substrate 171. The substrate 171 is driven by the driving unit 176 to rotate in a high speed around the driving unit 176. In the present embodiment, the driving unit 176 is a motor.

As shown in FIG. 2, a light path conversion region 172 and the light conversion region 173 are provided on a top surface of the substrate 171. A top surface of the wavelength conversion device 170 is a circular plane, and the light path conversion region 172 and the light conversion region 173 are two concentric annular areas with different radii, in the present embodiment, the light conversion region 173 has an annular-sector shape and is closer to an edge of the substrate 171 than the light path conversion region 172, that is, a radius of the light conversion region 173 is larger than that of the light path conversion region 172. It can be understood that in other embodiments, the light path conversion region 172 can be closer to the edge of the substrate 171 than the light conversion region 173, that is, the radius of the light path conversion region 172 can be larger than that of the light conversion region 173.

Specifically, the light path conversion region 172 includes a first segment 172a and a second segment 172b, and both the first segment 172a and the second segment 172b have an annular-sector shape. In the present embodiment, the first segment 172a and the second segment 172b are connected. It can be understood that in other embodiments, the first segment 172a and the second segment 172b are spaced apart from each other.

Further, the light conversion region 173 and the first segment 172a have a same shape, the light conversion region 173 and the first segment 172a each are symmetric with respect to a same axis h, and the second segment 172b is arranged farther from an gap of annular-sector shape where the light conversion region 173 is located than the first segment 172a.

The first segment 172a is provided with a first reflective section, the second segment 172b is provided with a second reflective section, and both the first reflective section and the second reflective section are provided with a first reflection surface and a second reflection surface for reflecting the excitation light. The first reflection surface and the second reflection surface are both made of a specular reflection material, such as a high-reflectance metal material including high-reflectance aluminum, silver or the like. In other embodiments, the second reflection surface is a scattering surface, such as a Gaussian scattering surface. When the excitation light is incident to the second reflection surface, the coherency of the scattered excitation light is reduced, and a speckle phenomenon is alleviated. During the high-speed rotation of the wavelength conversion device 170, different scattering areas irradiated by the excitation light form different speckle patterns. During the rotation of the second reflection surface, a human eye integral are performed on different speckle patterns to form uniform blue excitation light.

In other embodiments, the light path conversion region 172 can include three or more segments so as to guide the excitation light to different light paths. For example, the light path conversion region 172 includes three segments, i.e., a first segment, a second segment and a third segment. The first segment, the second segment and the third segment alternately receive the excitation light emitted from the light source and respectively guide the excitation light to three different preset light paths, that is, the first segment guides the excitation light to a first preset light path, the second segment guides the excitation light to a second preset light path, and the third segment guides the excitation light to a third preset light path. Alternatively, two of the segments guide the excitation light to a same preset light path, and another segment guides the excitation light to another preset light path. For example, the first segment and the second segment guide the excitation light to the first preset light path, and the third segment guides the excitation light to the second preset light path. When the light path conversion region 172 includes four, five or more segments, the principle is similar to that described above.

Figure 3:
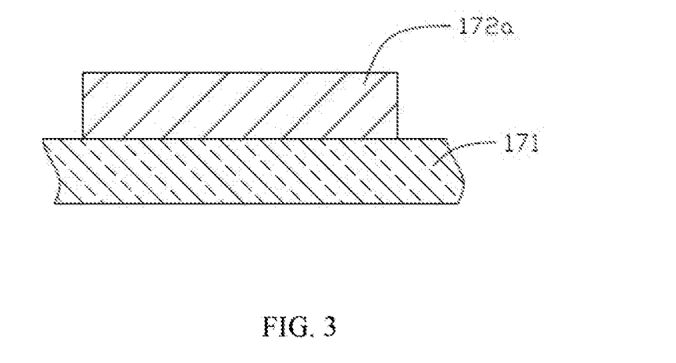
FIG. 3 is a sectional view of the wavelength conversion device shown in FIG. 2 taken along a line III-III.
Figure 4:
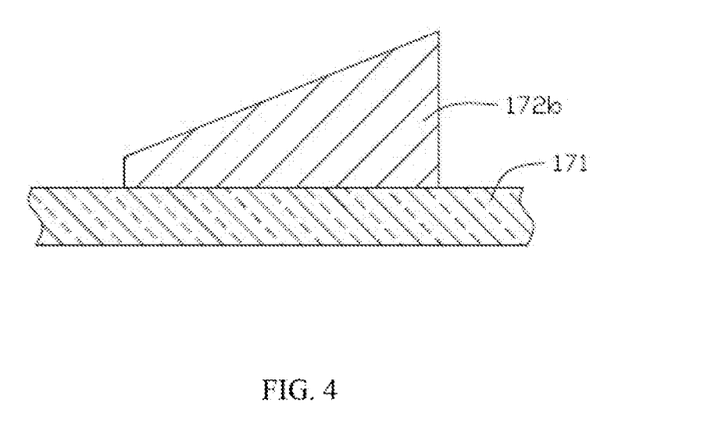
FIG. 4 is a sectional view of the wavelength conversion device shown in FIG. 2 taken along a line IV-IV.

Please refer to FIG. 3 and FIG. 4 in conjunction with FIG. 1. FIG. 3 is a sectional view of the wavelength conversion device 170 show n in FIG. 2 taken along a line III-III. FIG. 4 is a sectional view of the wavelength conversion device 170 shown in FIG. 2 taken along a line IV-IV. As show n in FIG. 3, the first reflection surface of the first segment 172a is parallel to a surface of the substrate 171, and the first reflection surface and the second reflection surface are non-coplanar. As shown in FIG. 4, a cross section of the second reflective section of the second segment 172b is a right-angled trapezoid, and a hypotenuse of the right-angled trapezoid is a reflection surface. The second reflective section includes one second reflection surface and multiple sidewalls connected to the second reflection surface. The multiple sidewalls are all perpendicular to the surface of the substrate 171. The second refection surface is disposed facing away from the substrate 171 and is not perpendicular to at least one of the multiple sidewalls. The first segment 172a and the second segment 172b are configured to receive the excitation light. During the high-speed rotation of the wavelength conversion device 170, the first segment 172a and the second segment 172b are alternately located on the light path of the excitation light and then alternately reflect the excitation light to different preset light paths. Specifically, when the first segment 172a is located on the light path of the excitation light, the excitation light is reflected by the first segment 172a to the first preset light path L1, and is incident to the first light guiding device 130; and when the second segment 172b is located on the light path of the excitation fight, the excitation light is reflected by the second segment 172b to the second preset light path L2, and is incident to the second light guiding device 150.

As show in FIG. 2, the light conversion region 173 is provided with a wavelength conversion material to receive the excitation light emitted from one of the first segment 172a and the second segment 172b, to convert the received excitation light into excited light having at least one color whose wavelength is different from that of the excitation light, and to emit the excited light. In the present embodiment, the light conversion region 173 is provided with a red light segment 173a and a green light segment 173b. The red light segment 173a is provided with red phosphor to generate red excited light when being excited by the excitation light, and the green light segment 173b is provided with green phosphor to generate green excited light when being excited by the excitation light. In the present embodiment, the red light segment 173a and the green light segment 173b are identical in shape and size. It can be understood that, in other embodiments. Central angles corresponding to the red light segment 173a and the green light segment 173b can be changed according to needs so as to change a ratio of the generated red excited light to the generated green excited light. In addition, in other embodiments, the light conversion region 173 can be further provided with phosphor having other color to generate excited light having other color. For example, the light conversion region 173 can be provided with green phosphor and yellow phosphor, alternatively, the light conversion region 173 is provided with only the yellow phosphor to generate yellow excited light.

Please refer to FIG. 1 in conjunction with FIG. 2. The first light guiding device 130 includes a first reflective element 131, a second light splitting-combining element 133, and a collection lens group 135.

Specifically, the first reflective element 131 is configured to reflect the excitation light propagated along the first preset light path L1 and guide the reflected excitation light to the second light splitting-combining element 133. The second light splitting-combining element 133 is configured to reflect the excitation light and to transmit the excited light. In the present embodiment, the second light splitting-combining element 133 is provided with a film reflective to blue light and transmissive to yellow light. The collection lens group 135 is disposed close to the wavelength conversion device 170. The collection lens group 135 converges the excitation light that is emitted from the second light splitting-combining element 133 and propagated along the first preset light path L1 to the light conversion region 173. The excited light generated by the light conversion region 173 is collimated by the collection lens group 135, passes through the second light splitting-combining element 133, and then is incident to the first light splitting-combining element 180 along the first preset light path L1. Of course, in other embodiments, the first light guiding device 130 can not include the collection lens group 135, the light emitted from the light splitting-combining element 133 directly enters the wavelength conversion device 170, and the light emitted from the wavelength conversion device 170 exits after being guided by the second light splitting-combining element 133. In other embodiments, the first light guiding device 130 can include a first module and a second module, the first module is configured to guide the excitation light emitted along the first preset light path L1 to the light conversion region 173 of the wavelength conversion device 170, and the second module guides the excited light generated by the light conversion region 173 to the first light splitting-combining element 180. In the case, light propagating along different preset light paths can be guided to their corresponding optical devices by only using the first light guiding device.

The second light guiding device 150 includes a second reflective element 151 and a homogenizing element 153. The second reflective element 151 is configured to reflect the excitation light propagated along the second preset light path L2 and then to guide the excitation light to the homogenizing element 153. The homogenizing element 153 homogenizes the incident excitation light, guides the excitation light to the first light splitting-combining element 180, and adjusts a diameter of the excitation light, such that the excitation light and the excited light that are incident to the first light splitting-combining element 180 have a same beam diameter, thereby improving the uniformity of the light exiting from the first light splitting-combining element 180.

The first light splitting-combining element 180 is configured to reflect the excitation light and to transmit the excited light. In the present embodiment, the first light splitting-combining element 180 and the second light splitting-combining element 133 have a same structure and function.

The light source system 100 provided in the first embodiment of the present disclosure includes the wavelength conversion device 170. The light path conversion region 172 of the wavelength conversion device 170 guides the excitation light emitted by the excitation light source 110 to the first preset light path L1 and the second preset light path L2 in a time-divisional manner. After passing through the first light guiding device 130, the excitation light emitted along the first preset light path L1 is incident to the light conversion region 173 of the wavelength conversion device 170, and thus the excited light is generated. After passing through the second light guiding device 150, the excitation light emitted along the second preset light path L2 is emitted. The light path of the excited light emitted through the first preset light path L1 and that of the excitation light emitted through the second preset light path L2 are separated from each other, thereby avoiding utilizing area coating for combining the excitation light and the excited light, reducing the loss of the excitation light and improving the uniformity of emitted light. In addition, the light source system 100 in the embodiments of the present disclosure as a whole is arranged on the platform of the wavelength conversion device 170 and has a compact structure, thereby reducing the volume of space occupied by the light source system 100 and being beneficial to the miniaturization design of the projection device employing the light source system 100.

Figure 5:
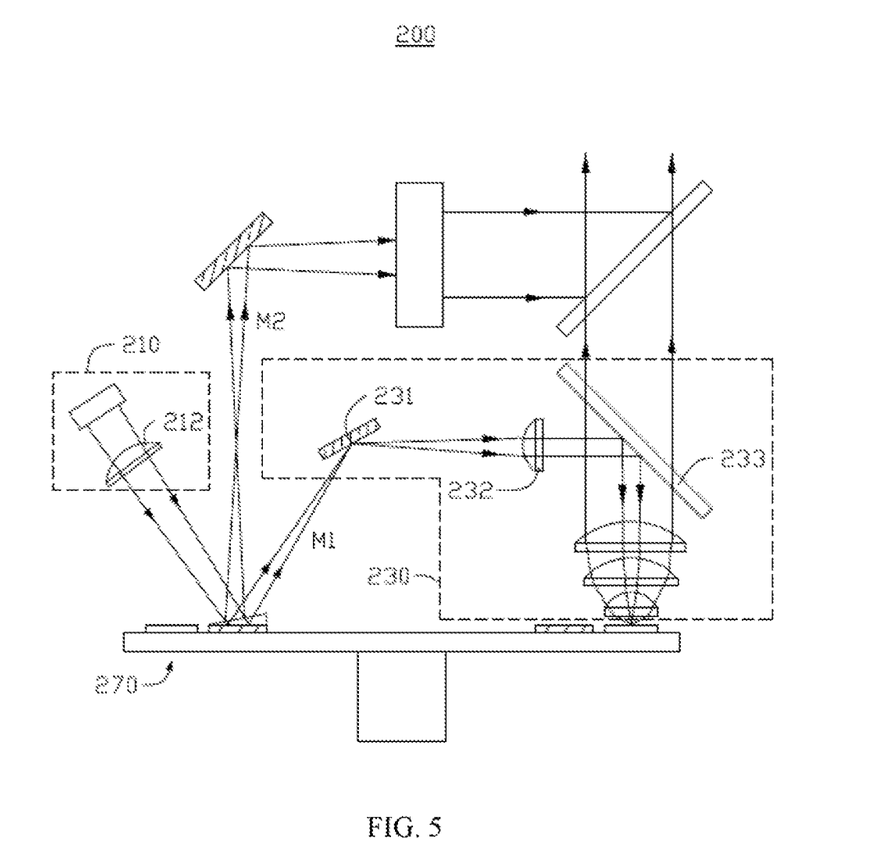
FIG. 5 is a structural schematic diagram of a light source system according to a second embodiment of the present disclosure.

Please refer to FIG. 5, which is a structural schematic diagram of a light source system 200 according to a second embodiment of the present disclosure. A difference between the light source system 200 in die present embodiment and the light source system 100 is that an excitation light source 210 and a first light guiding device 230 of the light source system 200 are respectively provided with a convergent lens 212 and a convergent lens 232 that are configured to converge light. Other pans in the present embodiment are the same as those in the first embodiment, and are not repeated herein.

Specifically, the convergent lens 212 of the excitation light source 210 is configured to converge the excitation light. The convergent lens 212 has a relatively long focal length, and the excitation light is still in a converging state after sequentially passing through the convergent lens 212 and being reflected by a first segment (not shown) of a wavelength conversion device 270, and is focused close to a first reflective element 231 along a first preset light path M1.

The convergent lens 232 of the first light guiding device 230 is disposed between the first reflective element 231 and a second light splitting-combining element 233 so as to converge the excitation light propagated along the first preset light path M1.

A width of the excitation light beam converged by the convergent lens 212 is relatively small, and accordingly, a size of the first reflective element 231 can be arranged to be very small, such that the first preset light path M1 and a second preset light path M2 have an enough separation space, thereby greatly reducing a possibility of mutual interference and being beneficial to the miniaturization design of the light source system 200 and the projection device employing the light source system 200.

Same as the first embodiment, the light source system 200 provided in the second embodiment of the present disclosure avoids utilizing area coating to achieve the combination of excitation light and excited light, which reduces the loss of excitation light and improves the uniformity of emitted light. In addition, the light source system 200 provided by the embodiments of the present disclosure has a compact structure, which reduces the volume of space occupied by the light source system 200 and is beneficial to the miniaturization design of the projection device employing the fight source system 200.

Figure 6:
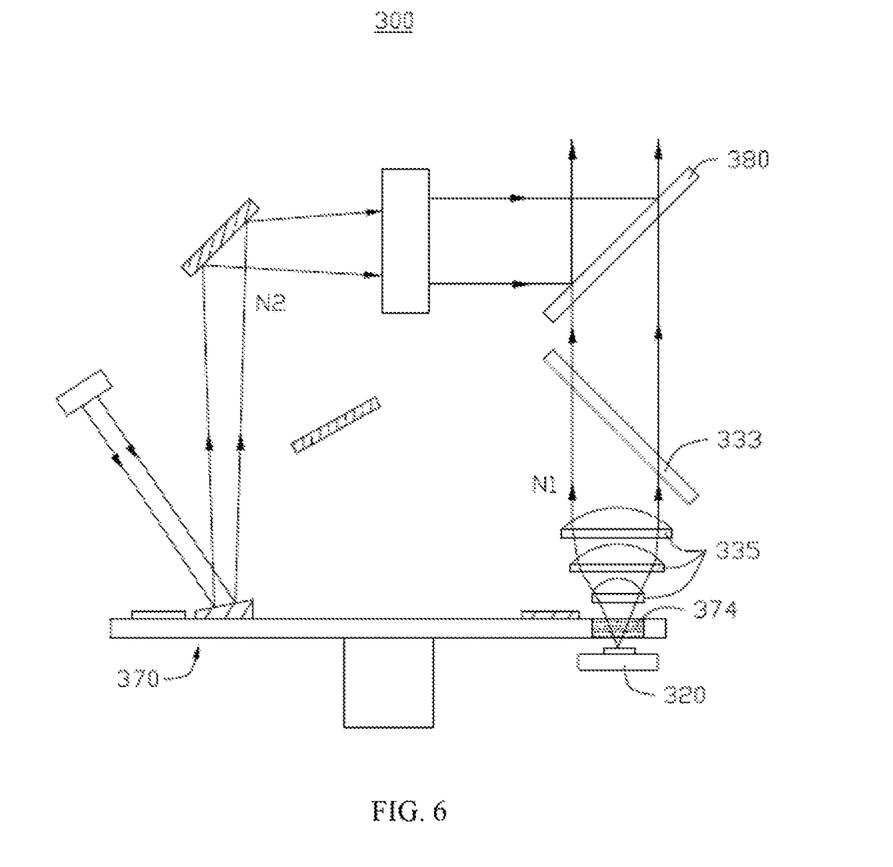
FIG. 6 is a structural schematic diagram of a light source system according to a third embodiment of the present disclosure.

Please refer to FIG. 6, which is a structural schematic diagram of a light source system 300 according to a third embodiment of the present disclosure. A difference between the light source system 300 in the present embodiment and the fight source system 100 in the first embodiment is that the fight source system 300 includes a supplemental light source 320 for generating supplemental fight. In addition, a wavelength conversion device 370 in the present embodiment and the wavelength conversion device 170 are different in structure. Other parts of the present embodiment are the same as those in the first embodiment, and are not repeated herein. Of course, the present embodiment can be obtained by adding the supplemental light source 320 and other structures corresponding to the supplemental light source based on the second embodiment.

Figure 7:
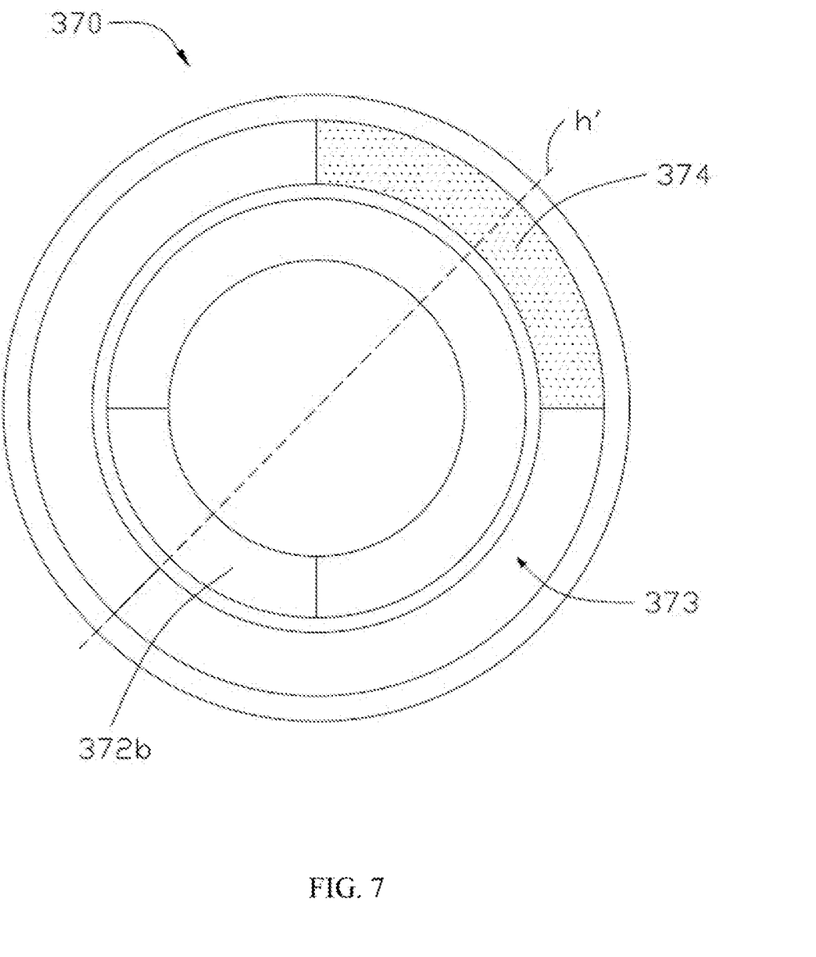
FIG. 7 is a top view of a wavelength conversion device shown in FIG. 6.

Please refer to FIG. 7, which is a top view of the wavelength conversion device 370 shown in FIG. 6. Based on the structure of the wavelength conversion device 170, the wavelength conversion device 370 further includes a transmission region 374 capable of transmitting light. The transmission region 374 is filled with anti-reflective glass having a high refractive index. The transmission region 374 and a light conversion region 373 are annular areas having a same concentric center and a same radius. The transmission region 374 and a second segment 372b have a same shape, and each of them is symmetric with respect to a same axis h'.

As shown in FIG. 7, the supplemental fight source 320 is disposed at a side of the wavelength conversion device 370 and is configured to generate supplemental light. The supplemental light source 320 is farther away from a collection lens group 335 than a fluorescent spot on the wavelength conversion device 370. The supplemental light emitted from the transmission region 374 is incident to a first light splitting-combining element 380 via the collection lens group 335 and a second light splitting-combining element 333 along a first preset light path N1. The supplemental light passes through the transmission region 374 having a high refractive index, such that an optical path length of the supplemental light passing through the transmission region 374 is reduced, thereby improving the efficiency of the collection lens group 335 to collect the supplemental light.

Figure 8:
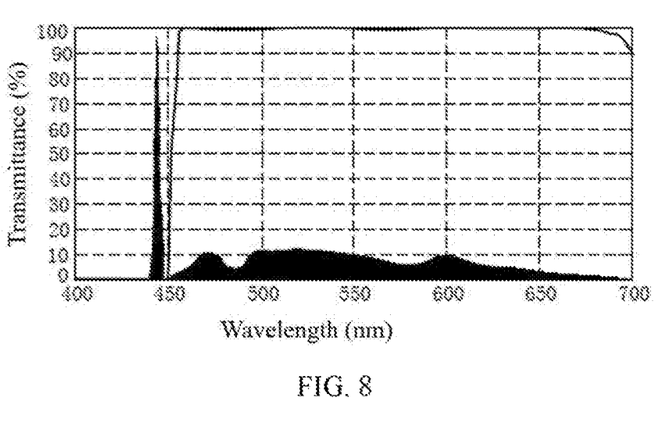
FIG. 8 is a graph showing a transmittance curve of a first light splitting-combining element shown in FIG. 6 and a wavelength curve of a light beam incident to the first light splitting-combining element.

The supplemental light source 320 includes an LED light source. The supplemental light and the excitation light are of a same color and have different wavelengths. Please refer to FIG. 8, which shows a transmittance curve of the first light splitting-combining element 380 shown in FIG. 6 and a wavelength curve of a light beam incident to the first light splitting-combining element 380. In the present embodiment, the excitation light source is a blue laser and emits blue excitation light having a wavelength of 445 nm. The supplemental light source 320 is a blue LED and emits blue supplemental light having a wavelength ranging from 463 nm to 475 nm. The first light splitting-combining element 380 and the second light splitting-combining element 333 are the same in structure and function, and are both configured to reflect the excitation light and to transmit the supplemental light and the excited light.

The supplemental light and the excitation light propagated along a second preset light path N2 are combined at the first light splitting-combining element 380, which further eliminates the speckle phenomenon of the excitation light emitted by the light source system 300.

Same as the first embodiment, the light source system 300 provided in the third embodiment of the present disclosure avoids utilizing area coating to achieve the combination of excitation light and excited light, which reduces the loss of excitation light and improves the uniformity of emitted light. In addition, the light source system 300 provided by the embodiments of the present disclosure has a compact structure, which reduces the volume of space occupied by the light source system 300 and is beneficial to the miniaturization design of the projection device employing the light source system 300.

The above is merely embodiments of the present invention, and thus does not limit the patent scope of the present disclosure. Any equivalent structure or equivalent process transformation made by using the description and drawings of the present disclosure, or direct or indirect use of the description and drawings of the present disclosure in other related technical fields shall fall into the patent protection scope of the present disclosure.

What is claimed is:

1. A wavelength conversion device, wherein a light conversion region and a light path conversion region which comprises a first segment and a second segment are provided on one surface of the wavelength conversion device, wherein the first segment and the second segment are configured to alternately receive excitation light and respectively guide the excitation light to different preset light paths, wherein the light conversion region is provided with a wavelength conversion material for receiving excitation light emitted from one of the segments, converting the received excitation light into excited light that has at least one wavelength range different from a wavelength of the excitation light, and emitting the excited light.

2. The wavelength conversion device according to claim 1, wherein the first segment is provided with a first reflective section and the second segment is provided with a second reflective section, wherein the first reflective section and the second reflective section are respectively provided with a first reflection surface and a second reflection surface that are configured to reflect the excitation light, and the first reflection surface and the second reflection surface are non-coplanar.

3. The wavelength conversion device according to claim 2, wherein the first reflection surface is parallel to the one surface of the wavelength conversion device, and the second reflection surface is angled at a preset inclination angle with respect to a plane of the first reflection surface.

4. The wavelength conversion device according to claim 2, wherein the second reflection surface is a scattering surface.

5. The wavelength conversion device according to claim 1, wherein a surface of the wavelength conversion device is circular, and the light conversion region and the light path conversion region are two concentric annular areas with different radii.

6. The wavelength conversion device according to claim 5, wherein the light conversion region, the first segment, and the second segment each have a annular-sector shape, wherein the light conversion region and the first segment have a same shape and each is symmetric with respect to a same axis, and wherein the second segment is farther from an gap of annular-sector shape where the light conversion region is located than the first segment.

7. The wavelength conversion device according to claim 6, wherein the wavelength conversion device further comprises a transmission region capable of transmitting light.

8. The wavelength conversion device according to claim 7, wherein the transmission region is an annular area that has a same center and a same radius as the light conversion region, and wherein the transmission region and the second segment have a same shape and each is symmetric with respect to a same axis.

9. A light source system, comprising:
an excitation light source;
a first light guiding device;
a second light guiding device;
a first light splitting-combining element; and
a wavelength conversion device,
wherein a light conversion region and a light path conversion region which comprises a first segment and a second segment are provided on one surface of the wavelength conversion device, wherein the first segment and the second segment are configured to alternately receive excitation light and respectively guide the excitation light to different preset light paths, wherein the light conversion region is provided with a wavelength conversion material for receiving excitation light emitted form one of the segment, converting the received excitation light into excited light that has at least one wavelength range different from a wavelength of the excitation light, and emitting the excited light; and
wherein the excitation light source is configured to generate the excitation light, and the excitation light is incident to the light path conversion region of the wavelength conversion device;
the light path conversion region is configured to receive the excitation light, and to at least alternately emit excitation light propagated along a first preset light path and that propagated along a second preset light path, wherein the first preset light path and the second preset light path are separated from each other;
the first light guiding device is configured to guide the excitation light emitted along the first preset light path to the light conversion region of the wavelength conversion device, and to direct the excited light generated by the light conversion region to the first light splitting-combining element;
the second light guiding device is configured to guide the excitation light emitted along the second preset light path to be incident to the first light splitting-combining element; and
the first light splitting-combining element is configured to guide a light beam emitted by the first light guiding device and a light beam emitted by the second light guiding device to exit along a same light path.

10. The light source system according to claim 9, wherein the first light guiding device comprises a first reflective element, a second light splitting-combining element, and a collection lens group close to the wavelength conversion device, and the second light splitting-combining element is configured to reflect the excitation light and to transmit the excited light;
wherein along the first preset light path, the excitation light is sequentially reflected by the first reflective element and the second light splitting-combining element, is converged by the collection lens group, and then is incident to the light conversion region; and the excited light generated by the light conversion region is collimated by the collection lens group, is transmitted by the second light splitting-combining element, and then is incident to the first light splitting-combining element.

11. The light source system according to claim 10, wherein the excitation light source comprises a first convergent lens, and part of the excitation light is focused near the first reflective element after being converged by the first convergent lens.

12. The light source system according to claim 9, wherein the second light guiding device comprises a second reflective element and a homogenizing element;
    wherein the excitation light emitted along the second preset light path is reflected by the second reflective element, then is homogenized by the homogenizing element, and then is incident to the first light splitting-combining element; and
    wherein the homogenizing element is also configured to adjust a diameter of the excitation light incident to the homogenizing element in such a manner that the excitation light and the excited light that are incident to the first light splitting-combining element have a same beam diameter.

13. The light source system according to claim 9, wherein the wavelength conversion device further comprises a transmission region capable of transmitting light, the light source system further comprises a second light source, and the second light source is disposed at a side of the wavelength conversion device and is configured to generate a second light; and
    wherein the second light is emitted to the first light splitting-combining element through the transmission region and is combined with the excitation light.

14. The light source system according to claim 13, wherein the second light source comprises an LED light source, and the second light and the excitation light have a same color and different wavelengths.

15. The light source system according to claim 13, wherein the first light splitting-combining element is configured to reflect the excitation light and to transmit the second light and the excited light.

16. The light source system according to claim 9, wherein the first segment is provided with a first reflective section and the second segment is provided with a second reflective section, wherein the first reflective section and the second reflective section are respectively provided with a first reflection surface and a second reflection surface that are configured to reflect the excitation light, and the first reflection surface and the second reflection surface are non-coplanar.

17. The light source system according to claim 16, wherein the first reflection surface is parallel to the one surface of the wavelength conversion device, and the second reflection surface is angled at a preset inclination angle with respect to a plane of the first reflection surface.

18. The light source system according to claim 9, wherein a surface of the wavelength conversion device is circular, and the light conversion region and the light path conversion region are two concentric annular areas with different radii.

19. The light source system according to claim 18, wherein the light conversion region, the first segment, and the second segment each have a annular-sector shape, wherein the light conversion region and the first segment have a same shape and each is symmetric with respect to a same axis, and wherein the second segment is farther from an gap of annular-sector shape where the light conversion region is located than the first segment.

20. A projection device comprising a light source system, the light source system comprising:
    an excitation light source;
    a first light guiding device;
    a second light guiding device;
    a first light splitting-combing element; and
    a wavelength conversion device,
    wherein a light conversion region and a light path conversion region which comprises a first segment and a second segment are provided on one surface of the wavelength conversion device, wherein the first segment and the second segment are configured to alternately receive excitation light and respectively guide the excitation light to different preset light paths, wherein the light conversion region is provided with a wavelength conversion material for receiving excitation light emitted from one of the segments, converting the received excitation light into excited light that has at least one wavelength range different from a wavelength of the excitation light, and emitting the excited light; and
    wherein the excitation light source is configured to generate the excitation light, and the excitation light is incident to the light path conversion region of the wavelength conversion device;
    the light path conversion region is configured to receive the excitation light, and to at least alternately emit excitation light propagated along a first preset light path and that propagated along a second preset light path, wherein the first preset light path and the second preset light path are separated from each other;
    the first light guiding device is configured to guide the excitation light emitted along the first preset light path to the light conversion region of the wavelength conversion device, and to direct the excited light generated by the light conversion region to the first light splitting-combining element;
    the second light guiding device is configured to guide the excitation light emitted along the second preset light path to be incident to the first light splitting-combining element; and
    the first light splitting-combining element is configured to guide a light beam emitted by the first light guiding device and the emitted by the second light guiding device to exit along a same light path.

* * * * *

UNITED STATES PATENT AND TRADEMARK OFFICE
CERTIFICATE OF CORRECTION

PATENT NO. : 11,073,751 B2
APPLICATION NO. : 16/646404
DATED : July 27, 2021
INVENTOR(S) : Zuqiang Guo et al.

Page 1 of 1

It is certified that error appears in the above-identified patent and that said Letters Patent is hereby corrected as shown below:

In the Claims

Column 10, Line 17, delete "light emitted form one of the segment" insert --light emitted from one of the segments--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*